United States Patent
Pagan

(10) Patent No.: US 6,178,006 B1
(45) Date of Patent: Jan. 23, 2001

(54) PHOTOPLOTTING METHOD AND AN ARRANGEMENT FOR PLOTTING A COMPUTER-STORED RASTER IMAGE ON A PLANE, PHOTOSENSITIVE RECORD CARRIER

(75) Inventor: Robin Pagan, Stuttgart (DE)

(73) Assignee: MIVATEC Hard-und Software GmbH, Schonaich (DE)

(*) Notice: Under 35 U.S.C. 154(b), the term of this patent shall be extended for 0 days.

(21) Appl. No.: 09/061,276

(22) Filed: Apr. 17, 1998

(30) Foreign Application Priority Data

Apr. 18, 1997 (DE) .............................................. 197 16 240

(51) Int. Cl.[7] .......................... G06K 15/00; G06K 15/10; B41J 2/445; B41J 2/47
(52) U.S. Cl. ........................... 358/1.3; 358/1.8; 347/239; 347/244; 347/243
(58) Field of Search .............................. 358/1.9, 1.3, 1.8; 347/239, 244, 255, 256, 258, 135, 137; 359/227, 245, 246, 247, 252, 259, 263

(56) References Cited

U.S. PATENT DOCUMENTS

| | | | |
|---|---|---|---|
| 4,016,416 | * | 4/1977 | Shepherd, Jr. et al. ............. 347/239 |
| 4,073,650 | | 2/1978 | Yevick . |
| 4,357,619 | | 11/1982 | Klockenbrink . |
| 4,514,858 | * | 4/1985 | Novak et al. ......................... 358/1.9 |
| 4,675,702 | * | 6/1987 | Gerber et al. ........................ 347/241 |

(List continued on next page.)

FOREIGN PATENT DOCUMENTS

| | | |
|---|---|---|
| 4121509 | 1/1992 | (DE) . |
| 739125 | 10/1996 | (EP) . |
| 96/30806 | 10/1996 | (WO) . |

OTHER PUBLICATIONS

"MIVATEC Xenon Plotter," MIVATEC Hard–und Software GmbH ( Oct. 1996).

(List continued on next page.)

*Primary Examiner*—Scott Rogers
(74) *Attorney, Agent, or Firm*—Greenblum & Bernstein, P.L.C.

(57) ABSTRACT

Method and apparatus for plotting a raster image on a plane record carrier. A computer-stored raster image includes raster points and is convertable into controllable, raster-point related light beams in which picture elements corresponding to the raster points are plotted on the record carrier. The method includes dividing the computer raster image into matrix-like imaginary computer raster image subareas, dividing the raster image of the record carrier into matrix-like imaginary raster image subareas of the record carrier, and associating the subareas of the computer raster image and the subareas of the raster image of the record carrier with each other. The method further includes dividing the computer raster image subareas into n matrix-like imaginary raster point positions, dividing the raster image subareas of the record carrier into n matrix-like imaginary picture element positions, and associating the n matrix-like picture element positions with the n matrix-like raster point positions. Further, the method provides for successively plotting the picture elements that correspond with the raster points in successive time intervals Tq, wherein q represents values 1–n, and simultaneously plotting, during a $q^{th}$ time interval, respective $q^{th}$ picture elements associated with a $q^{th}$ picture element position of the raster image subareas of the record carrier, and moving, during the $q^{th}$ time interval, an aperture matrix that includes matrix-like arranged aperture matrix fields, each having an aperture for passing a light beam, and aligning each aperture with the $q^{th}$ picture element position to plot the respective $q^{th}$ picture element. The apparatus includes the matrix-like arrangements of the computer raster image, the computer raster image subareas, the raster image of the record carrier, and the raster image subareas of the record carrier, and the aperture field.

30 Claims, 9 Drawing Sheets

U.S. PATENT DOCUMENTS

| | | |
|---|---|---|
| 4,707,743 | 11/1987 | Tokumitsu et al. . |
| 4,739,416 * | 4/1988 | Manian et al. .................... 347/241 |
| 4,829,339 | 5/1989 | Dwyer . |
| 4,922,284 | 5/1990 | Dwyer . |
| 4,924,254 | 5/1990 | Dwyer, III . |
| 5,016,040 | 5/1991 | Dwyer, III . |
| 5,049,901 * | 9/1991 | Gelbart et al. .................... 359/227 |
| 5,120,127 | 6/1992 | Dwyer . |
| 5,270,825 * | 12/1993 | Takasugi et al. .................... 347/239 |
| 5,434,600 | 7/1995 | Schoon . |
| 5,754,217 | 5/1998 | Allen . |

OTHER PUBLICATIONS

"MIVATEC Xenon Plotter," Information sheet, MIVATEC Hard–und Software GmbH ( Oct. 1, 1997).

* cited by examiner

M= 1:3

PHOTOPLOTTING METHOD AND AN ARRANGEMENT FOR PLOTTING A COMPUTER-STORED RASTER IMAGE ON A PLANE, PHOTOSENSITIVE RECORD CARRIER

CROSS-REFERENCE TO RELATED APPLICATIONS

The present application claims priority under 35 U.S.C. §119 of German Patent Application No. 197 16 240.1, filed on Apr. 18, 1997, the disclosure of which is expressly incorporated by reference herein in its entirety.

BACKGROUND OF THE INVENTION

1. Field of the Invention

The invention relates to a photoplotting method and an arrangement for plotting a computer-stored raster image on a plane, photosensitive record carrier, i.e., for plotting picture elements (pixels) on a record carrier. The picture elements to be plotted may be arranged, at raster (grid pattern or matrix) positions, according to a raster, which may be defined by points of intersection of equidistant X/Y lines.

The photoplotting method and arrangements serve, e.g., to produce photographic artwork for printed circuit boards.

2. Discussion of Background Information

Photoplotters plotting a computer-stored raster image on a plane, photosensitive record carrier are known in the prior art (information sheet "Xenon Plotter" by the company MIVATEC, Hard- und Software GmbH, Benzstr. 17, D-71171 Schönaich, of Oct. 15, 1996).

During said plotting, an exposure head (with a plotting area of about 5×7.5 mm) is guided over a record carrier, which has a large area (up to about 720×600 mm) in relation to it, for the purpose of plotting picture elements, which make up the raster image of the record carrier.

The exposure head is provided with an LCD (liquid crystal device) matrix (or liquid crystal array) of light modulation elements. This LCD matrix comprises multiple liquid crystal elements arranged in form of a matrix, each of which can be selectively controlled by electrical means in order to open or block it for transmitted light.

If transmitted light is projected onto this LCD matrix, it can only pass as a "light beam" through the matrix at the those element points that are controlled to admit passage. Each of the light beams admitted forms a corresponding picture element on the photosensitive record carrier. Missing light beams—equivalent to blocked elements—form "missing picture elements".

The raster image of the record carrier comprises a multiplicity of picture elements, including plotted or non-plotted (missing) ones.

In the aforesaid arrangement, light from a Xenon flash lamp is projected onto the LCD matrix. Since the exposure head containing the LCD matrix has a much smaller area (to be compared with the square of a chessboard) than the record carrier (to be compared with a chessboard with an enormous number of squares), said exposure head must successively be guided to all the positions of the chessboard squares so that picture elements can be plotted there.

In view of the desired high resolution (in the range of >10 micrometers) of the raster image of the record carrier, the movement of the exposure head over the entire area of the record carrier imposes the highest tolerance requirements with regard to the precision of the movement mechanism for the movement of the head.

The greater the movement distances, the more difficult it is to fulfil the highest tolerance requirements. The movement of the exposure head over the entire area of the record carrier is therefore problematic and limits the accuracy of plotting, quite apart from the enormous equipment and cost expenditure for such a movement mechanism. Additionally, the aforesaid photoplotters involve long plotting times (6 minutes to 1 hour, depending on resolution).

SUMMARY OF THE INVENTION

In order to avoid these disadvantages (movement mechanism operating over a large area, long plotting times), it is the aim of the invention to disclose a photoplotting method and an arrangement for its realization with a movement mechanism for a smaller movement area and for shorter plotting times.

Furthermore it is the aim of the invention to disclose a photoplotting method and an arrangement for its realization that permit plotting a raster image of the record carrier with a variable image scale so as to achieve, for example, a higher resolution in the case of reduced-scale images.

These aims of the invention are attained in an advantageous manner by the features stated in the characterizing part of claims 1 and 15.

Advantageous embodiments of the invention are characterized in the subclaims.

The invention relates to a method of plotting a raster image on a plane record carrier wherein a computer-stored raster image comprising raster points is converted into controllable, raster-point related light beams by means of which picture elements corresponding to the raster points are plotted on the record carrier.

Said method according to the invention comprises the following inventive steps:

the computer raster image is matrix-like divided into imaginary computer raster image subareas (A1, B1, C1, ... );

the raster image of the record carrier is matrix-like divided into imaginary raster image subareas (A1', B1', C1', ... ) of the record carrier;

the subareas of the computer raster image and the subareas of the raster image of the record carrier are associated with each other;

the computer raster image subareas (A1, B1, C1, ... ) are matrix-like divided into imaginary n raster point positions (r1–r9) and the raster image subareas (A1', B1', C1', ... ) of the record carrier are matrix-like divided into imaginary n picture element positions (p1–p9);

the picture element positions (p1–p9) are associated with the raster point positions (r1–r9);

the plotting of the picture elements corresponding to the raster points takes place in q (q=1–n) successive time intervals Tq (q=1–n) in such a way that during the $q^{th}$ time interval (q=1–n) all the picture elements in the $q^{th}$ picture element position of the raster image subareas (A1', B1', C1', ... ) of the record carrier are plotted simultaneously;

during the $q^{th}$ time interval, an aperture matrix (2) with matrix-like arranged aperture matrix fields (HA1, HB1, HC1, ... ), each having an aperture (a1, b1, c1, ... ) for the passage of a light beam in order to plot a picture element, is moved in such a way that the light beam is aligned with the respective $q^{th}$ picture element position.

Advantageously, this method according to the invention is further developed in such a way that I. the computer raster image subareas (A1, B1, C1, ...) and the raster image subareas (A1', B1', C1', ...) of the record carrier are associated with each other, while the plotting of all the picture elements of a raster image subarea (A1') of the record carrier takes place successively by means of the light beam (la1) that passes through the aperture (a1) of the aperture matrix field (HA1) associated with said subarea (A1');

II. the computer raster image subareas (A1*, B1*, C1*, ...) and raster image subareas (A1'*, B1'*, C1'*, ...) of the record carrier are varyingly associated with the aperture matrix fields (HA1*, HB1*, HC1*, ...), while the plotting of all the picture elements of a raster image subarea (A1'*) of the record carrier takes place successively by means of light beams that pass through the apertures (a1*, b2*, c3*) of different aperture matrix fields (HA1*, HB2*, HC3*) the order of which is freely determined;

III. the conversion of the computer raster image into controllable light beams takes place by means of a light-irradiated LCD (liquid crystal device) matrix with matrix-like arranged light modulation elements (LA1, LB1, LC1, ...), each of which is associated with a computer raster image subarea (A1, B1, C1, ...);

during the $q^{th}$ time interval, each light modulation element (LA1, LB1, LC1, ...) is controlled to block or admit the passage of light according to the status of the $q^{th}$ raster point of the computer raster image subarea (A1, B1, C1, ...) associated with said element (LA1, LB1, LC1, ...);

and in that the light (L) passing through the light modulation element (LA1, LC1, ...) is directed onto the aperture matrix field (HA1, HC1) associated with said element (LA1, LC1, ...);

and in that in each case a picture element is plotted by means of the light beam (la1, lc1, ...) passing through the aperture (a1, c1, ...) of said aperture matrix field (HA1, HC1, ...);

IV. the conversion of the computer raster image into controllable light beams takes place by means of a light-irradiated LCD matrix with matrix-like arranged light modulation elements (LA1*, LB1*, LC1*, ...);

each computer raster image subarea (A1*) is associated with one of several light modulation elements (LA1*, LB2*, LC3*) for a certain number of time intervals;

during the $q^{th}$ time interval, the relevant associated light modulation element (LA1*, LB2*, LC3*) is controlled to block or admit the passage of light according to the status of the $q^{th}$ raster point of the computer raster image subarea (A1*);

and in that the light passing through the light modulation element ( LA1*, LB2*, LC3*) is directed onto the aperture matrix field (HA1* HB2*, HC3*) associated with said element;

and in that in each case a picture element is plotted by means of the light beam passing through the aperture (a1*, b2*, c3*) of said aperture matrix field (HA1*, HB1*, HC3*);

V. the size of the raster image of the record carrier is dependent upon an image-scale determining lens arranged between the aperture matrix and the record carrier;

VI. the conversion of the computer raster image into controllable light beams takes place by means of a light-irradiated tilting mirror chip;

VII. the conversion of the computer raster image into controllable light beams takes place by means of a matrix of light modulation elements;

the aperture matrix is irradiated with parallel (LP) or converging (LK) light on the side turned away from the record carrier;

IX. the conversion of the computer raster image into controllable light beams and the movement of the aperture matrix and the record carrier relative to each other are controlled with the aid of a computer program;

X. the light falling upon the aperture matrix fields (HA1*, HB1*, HC1*, ...) is directed through their apertures (a1*, b1*, c1*, ...);

XI. the method is used for monochromatic visible or invisible light with a wavelength equal to or smaller than the wavelength of the light in the ultrared region;

XII. this method can be applied for the production of photographic artwork for printed circuit boards.

According to I, the plotting of all the picture elements of a subarea of the record carrier is effected by means of a light beam passing through the aperture of the corresponding single aperture matrix field; according to II, however, the plotting of all the picture elements of a subarea of the record carrier is effected by means of light beams passing through the apertures of several aperture matrix fields, so that plotting errors due to a faulty light modulation element are not concentrated in one subarea of the record carrier, but distributed over several subareas.

Furthermore, the invention relates to an arrangement for plotting a computer-stored raster image on a plane, photosensitive record carrier comprising the following inventive features:

a) an arrangement of matrix-like arranged controllable light-emitting or (1) light-irradiated light modulation elements (LA1, LB1, LC1, ...);

b) an aperture matrix (2) with matrix-like divided aperture matrix fields (HA1, HB1, HC1, ...; HA2, ...), each field comprising an aperture (a1, b1, c1, ...; a1, ...) for the passage of a light beam (la1, lc1, ...) in order to plot a picture element on the record carrier (5);

c) a division of the record carrier (5) into imaginary, matrix-like arranged raster image subareas (A1', B1', C1', ...; A2', ...) of the record carrier, each comprising matrix-like divided picture element positions (p1, p2, p3, ..., p9);

d) a movement mechanism (3) for the movement of the aperture matrix (2) and the record carrier (5) relative to each other;

wherein 1) the computer-stored raster image (0) is divided into imaginary, matrix-like arranged computer raster image subareas (A1, B1, C1, ...; A2), each comprising matrix-like divided raster point positions (r1, r2, r3, ... r9), each having a binary storage status (on, off);

2) the computer raster image subareas (A1, B1, C1, ...) and the raster image subareas (A1', B1', C', ... E1'; A2', ...) are associated with each other;

3) the raster point positions (r1, r2, r3, ... r9) of the computer raster image subareas (A1, B1, C1, ...) and the picture element positions (p1, p2, p3, ... p9) of the raster image subareas (A1', B1', C1'...) of the record carrier are associated with each other;

4) the number of controllable light-emitting or light-irradiated light modulation elements (LA1, LB1, LC1, ...) is equal to the number of apertures (a1, b1, c1, ...) of the aperture matrix (2) and equal to the number of raster image subareas (A1, B1, C1, ...) of the record carrier;

5) the apertures (a1, b1, c1, ...) of the aperture matrix field (HA1, HB1, HC1, ...) can be aligned (positioned) with the picture element positions of the raster image subareas of the record carrier by means of the movement mechanism;

6) for each movement position of the movement mechanism (3), the controllable light-emitting or the light-irradiated elements can be controlled with the aid of a computer program according to the storage status (on, off) of the raster point position (r1 of A1, r1 of A2) associated with said movement position, in such a way that the aperture mask fields (HA1, HB1, HC1, . . . ) associated with said elements (LA1, LB1, LC1, . . . ) can or cannot be irradiated with light;

7) the picture elements of a raster image subarea (A1') of the record carrier can be plotted successively;

8) the picture elements in identical picture element positions (p1 or p2 or p3, . . . ) of the raster image subareas (A1', B1', C1', . . . ) of the record carrier can be plotted simultaneously.

Advantageously, this arrangement according to the invention is further developed in such a way that the aperture of an aperture matrix field in fixed association with a controllable light-emitting or light-irradiated element can be successively aligned with all the picture element positions of a raster image subarea of the record carrier;

the aperture of several aperture matrix fields in varying association with controllable light-emitting or light-irradiated elements can be successively aligned with all the picture element positions of a raster image subarea of the record carrier; or that the movement mechanism (3) comprises a stepping-motor controlled XY/-coordinate stage (8) or a piezoelectric-crystal controlled device.

The arrangement of an image-scale determining lens between the aperture matrix and the record carrier permits recording of an image with different scales.

The image-scale determining lens (9-4) is smaller than the aperture mask (9-2) if a condenser lens (9-7, generating converging light (LK), is located in front of the aperture matrix (9-2) on the side turned away from the record carrier.

In order to increase the efficiency of the light falling upon an aperture matrix field (HA1, HB1, . . . ), light-concentrating means, such as optical lenses or Fresnel zone plates (comprising concentrically arranged flat circular or elliptical rings comprising a material whereby the phase of the light falling upon it can be shifted by half a wavelength of light) are arranged on each aperture matrix field (HA1, HB1, . . . ) on the side turned away from the record carrier, thus enabling the light falling upon these fields to be directed through the aperture (a1, b1) of said fields.

Advantageously, the arrangement of light-irtadiated light modulation elements (LA1, LB1, LC1, . . . ; LA2, . . . ) comprises an LCD (liquid crystal device) matrix or a tilting mirror chip (9-1).

An enlarging lens (9-6) is arranged between the tilting mirror chip (9-1) and the condenser lens (9-7) in order to adapt the small chip to the larger condenser lens.

The tilting mirror chip (9-1) and the aperture matrix (9-2) can be moved in opposite directions to each other, during which process the movement travel of the chip (9-1) and the aperture matrix (9-2) are different depending on the enlargement factor of the enlarging lens (9-6).

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
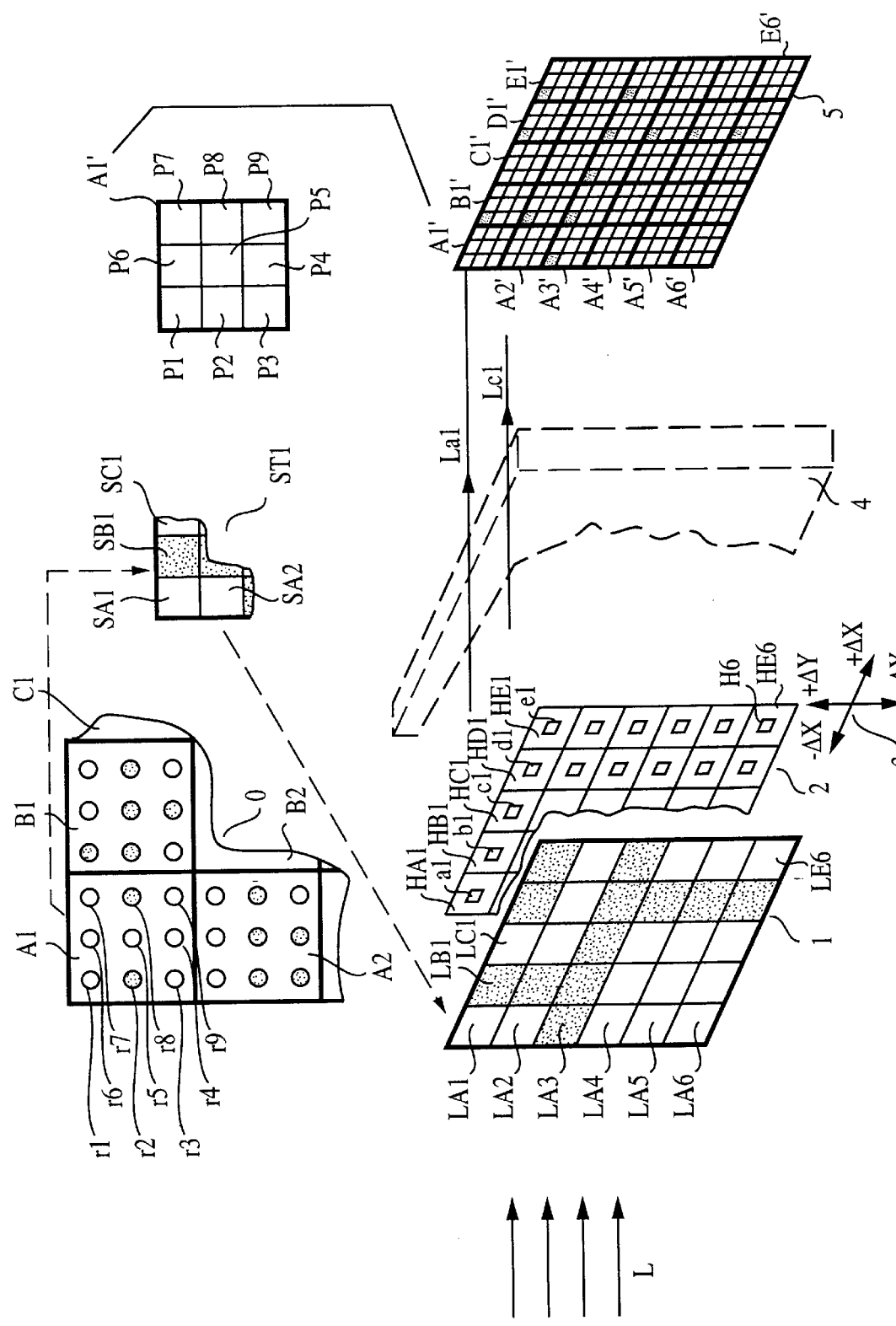
FIG. 1 is a schematic, perspective view of an arrangement according to the invention with an aperture matrix, an LCD matrix and a movement mechanism.

FIG. 1 shows a schematic, perspective view an arrangement according to the invention with an aperture matrix 2, an LCD (liquid crystal device) matrix 1 (or liquid crystal array) and a movement mechanism 3.

The computer-stored raster image 0 is divided into imaginary computer raster image subareas (A1, B1, C1, . . . ; A2, . . . ); each subarea comprising matrix-like arranged raster point positions (r1, r2, r3, r4 . . . r9). As discussed herein, computer-stored raster image is a computer stored value of each picture element (pixel) for each raster (grid pattern or matrix) position of the record carrier, i.e., pixels located at points of intersection of equidistant X/Y lines.

Each raster point position is to be understood as a storage cell with binary status (information content): "on" (represented as a white circle) or "off" (represented as a black circle).

Figuratively, the computer-stored raster image is composed of raster points having an "on" or an "off" status. The raster pitch, the imaginary distance between two neighboring raster points, is predetermined.

The raster image can be used for reproducing flat structures, e.g., the route of printed conductors on printed circuit boards.

Printed conductors of this type are designed with the aid a computer program and stored in a computer as a raster image; this image is plotted, with the aid of a computer program, on a photosensitive record carrier, which serves as artwork for the production of printed circuit boards.

The plotted raster image (raster image of the record carrier) is composed of picture elements as the smallest "picture points". The latter may comprise of, e.g., small round or square "picture points". Plotted "picture points" are represented as white areas, missing "picture points" as black area.

The raster image of the record carrier is divided into imaginary, matrix-like arranged raster image subareas (A1', B1', C1', D1', E1'; A2', ... ; ... E6') of the record carrier, each subarea comprising matrix-like arranged picture element positions (p1, p2, p3, ... p7, p8, p9).

The computer raster image subareas (A1, B1, C1, ...) and the raster image subareas (A1', B1', C1', ...) of the record carrier as well as the raster point positions (r1, r2, ... r9) and the picture element positions (p1, p2, ... p9) are associated with each other.

In relation to the raster points in the positions r1 of all the computer raster image subareas (A1, B1, C1, ...), the corresponding picture elements in the positions p1 of all the raster image subareas (A1', B1', C1', ...) of the record carrier are plotted simultaneously during a first time interval T1 (to which FIG. 1 refers).

In relation to the raster point in the position r1 of the subarea A1 with the status "on" (represented as a white area), a picture element is formed in the position p1 of the subarea A1' (also represented as a white area); in relation to the raster point in the position r1 of the subarea B1 with the status "off" (represented as a black area), a picture element is formed in the position p1 of the subarea B1' (represented as a black area).

In relation to the raster points in the positions r2 of all the computer raster image subareas (A1, B1, C1, ...), the corresponding picture elements in the positions p2 of all the raster image subareas (A1', B1', C1', ...) of the record carrier are plotted simultaneously during a second time interval T2 after the first time interval T1.

This applies analogously to the following time intervals T3, T4, etc., until finally in the case of the raster points in the positions r9 of all the computer raster image subareas (A1, B1, C1, ...), the corresponding picture elements in the positions p9 of all the raster image subareas (A1', B1', C1', ...) of the record carrier are plotted simultaneously during the ninth time interval T9.

In relation to the raster points in the nine raster point positions r1–r9, involving 3×3=9 raster points per computer raster image subarea, the corresponding picture elements in the nine picture element positions p1–p9 are plotted during nine successive time intervals T1 to T9.

The following describes how the plotting of the picture elements is effected during time interval T1 (FIG. 1):

The LCD 1 matrix comprises matrix-like arranged light modulation elements (LA1, LB1, LC1, ... ; LA2, ... ; LB2 ... ; ). The light modulation elements and the computer raster image subareas (A1, B1, C1, ... ; A2, ... ; B2, ... ; C2, ...) are associated with each other.

During the time interval T1, the status of the raster point in the position r1 of the subareas A1, B1, C1, ... determines whether the light modulation element (LA1, LB1, LC1, ...) associated with aforesaid subarea shall be controlled to admit the passage of light or to block the passage of light: Corresponding to the "on" status (represented white) of the raster point in the position r1 of the subarea A1, LA1 is controlled to admit the passage of light (represented white); corresponding to the "off" status (represented black) of the raster point in the position r1 of the subarea B1, LB1 is controlled to block the passage of light (represented black).

During the time interval T1, the control of the light modulation matrix takes place according to an imaginary control pattern ST1. This control pattern shows an imaginary matrix-like division into control commands (SA1, SB 1, SC1, ...) for the light modulation elements LA1, LB1, LC1, ... ). The control command SA1 (represented white) reflects the "on" status (represented white) of the raster point in the position r1 of the computer raster image subarea A1; the control command SB1 (represented black) reflects the "off" status of the raster point in the position r1 of the subarea A2, etc.

The following describes the function of the LCD matrix 1 in connection with the aperture matrix 2.

The aperture matrix 2 is divided into matrix-like arranged aperture matrix fields (HA1, HB1, ... ; HA2, HB2, HC2, ... ). The light modulation elements (LA1, LB1, LC1, ... ; LA2, LB2, LC2, ...) and the aperture matrix fields HA1, HB1, HC1, ...) are associated with each other.

Each aperture matrix field (HA1, HB1, ...) comprises an aperture (a1, b1, ... ), the dimension of which lies in the range of micrometers with the desired high resolution of the raster image to be plotted. Each aperture matrix field (HA1, HB1, HC1, ...) is associated with a raster image subarea (A1', B1', C1', ...) of the record carrier.

If parallel (transmitted) light L is projected onto the LCD matrix 1, it passes through the elements LA1, LC1, ... ), which are controlled to admit the passage of light, and falls upon the aperture matrix fields (HA1, HC1, ...) associated with said elements. In the area of the apertures (a1, c1, ... ) of these fields, the traversing light beams (la1, lc1, ... ) reach the record carrier where they cause the plotting of picture elements (represented white) in the picture element positions p1 of A1' and C1'.

In the case of the elements (LB1, LD1, ...) controlled to block the passage of light, no light can pass through the apertures b1, d1, ... ) of the aperture matrix fields (HB1, HD1, ...) associated with said elements, which is equal to the ,,"plotting" of "missing picture elements" (represented black) in the position p1 of B1' and D1', etc., by "missing light beams".

In this manner, the light beams passing through or not passing through the apertures of the aperture matrix fields cause the plotting of the picture elements in the picture element position p1 of all the raster image subareas (A1', B1', C1', ...) of the record carrier.

The following describes how the plotting of the picture elements is effected during the time interval T2:

During the time interval T2, a second control pattern ST2 (FIG. 3), reflecting the "on" or "off" status of the raster points in the second raster point position of all the computer raster image subareas (A1, B1, C1, . . . ), is projected onto the LCD matrix 1. The position sequence of the raster points (and of the picture elements) is freely predetermined (e.g., first column downwards—second column upwards—third column downwards as in FIG. 1 and 2).

The plotting of a picture element in a certain picture element position (p1, p2, . . . p9) in a raster image subarea (A1', B1', C1', . . . ) of the record carrier makes it necessary for each picture element position that the corresponding matrix aperture of the aperture matrix field is exactly aligned with the picture element position of the raster image subarea of the record carrier associated with the aperture matrix field.

Each raster image subarea A1' of the record carrier is associated with an aperture matrix field LA1 including an aperture a1. During each time interval, e.g., T1, the light beam passing through said aperture—provided the light modulation element LA1 associated with A1 is not blocked—plots a picture element in a certain picture element position, i.e., position p1 in the case of time interval T1.

For the plotting of the next picture element during the following time interval T2, the aperture matrix and the record carrier have to be moved relative to each other in such a way that the light beam then passing through the aperture a1 can plot the picture element in the position p2. In the embodiment according to FIG. 1, the aperture mask (together with the light modulation matrix connected therewith) is moved by the value Δy relative to the stationary record carrier 5. This movement value is exactly of the magnitude necessary for allowing the light beam to fall upon the picture element position p2 (below position p1) during the time interval T2.

The sequence of the picture elements positions p1, p2, p3 . . . p9 (corresponding to the sequence of the raster point positions p1, p2, . . . p9) is decisive for the movement steps to be carried out in the X/Y coordinate directions during the different time intervals.

In the case of the example shown in FIG. 1 with 3×3=9 picture element positions per raster image subarea of the record carrier, the aperture matrix 2 must successively (during 9 successive time intervals T1–T9) adopt 9 different movement positions corresponding to the 9 picture element positions of a raster image subarea of the record carrier, so that all the picture elements in this subarea (and thus also in all the other subareas) can be plotted, while the record carrier 5 is stationary.

Such an X/Y movement mechanism can easily be realized by means according to the state of the art, with low equipment expenditure and without critical tolerance problems. Details of such movement mechanisms are described below.

During the individual time intervals, the movement steps of the movement mechanism are controlled with the aid of a computer program in synchronization with the control of the light modulation matrix 1. In FIG. 1, the movement mechanism is characterized under 3 by a system of coordinates for movement steps ±Δx, ±Δy.

An advantage of the invention comprises in particular in the movement mechanism 3 only having a very small movement area, compared with the total area of the record carrier 5, corresponding to a raster image subarea of the record carrier. For plotting the entire raster image of the record carrier, comprising all the subareas, the aperture matrix merely needs to be moved by the extent of a subarea.

Another advantage of the invention comprises in the reduction of plotting time for the plotting of the entire raster image of the record carrier. According to the state of the art the exposure head has to be moved as in a chessboard pattern over the entire record carrier (such mechanical movements are time-consuming and lie in the range of minutes to hours), whereas according to the invention the movement is only carried out for extremely small movement steps of a very small movement area, while the mass of the parts to be moved is small.

Another advantage of the invention lies in the possibility to plot a reduced (enlarged) raster image of the record carrier with higher (lower) resolution by interposing a reducing (enlarging) lens between the aperture matrix 2 and the record carrier 5. Further details are described in connection with FIG. 5A and FIG. 5B.

Figure 2:
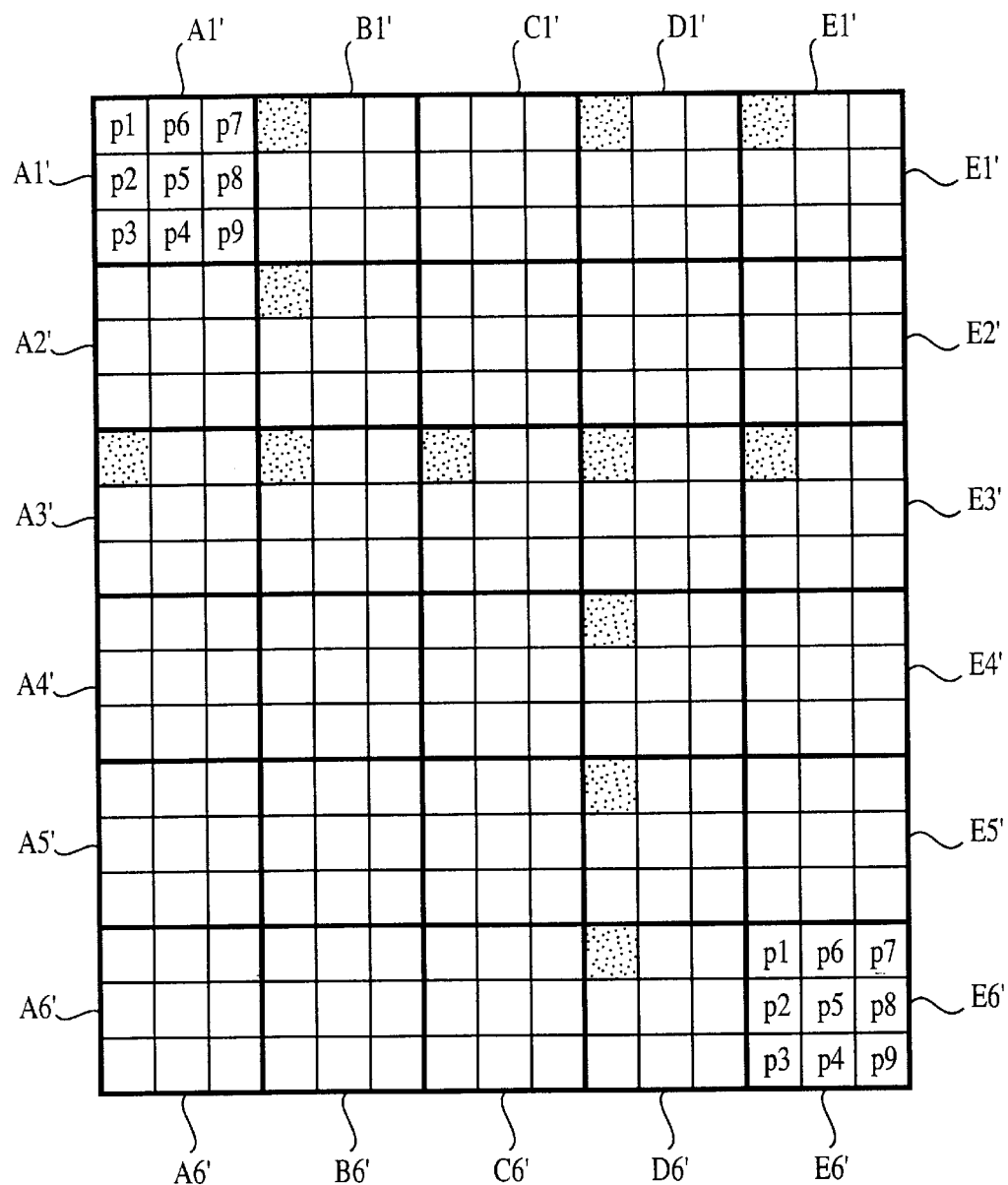
FIG. 2 is a schematic view of a record carrier with the picture elements plotted during a first time interval in the first picture element positions of all the raster image subareas of the record carrier.

FIG. 2 shows an enlarged representation of the picture elements plotted in all the picture element positions p1 to p9 during the time interval T1. The designations used in FIG. 1 have been retained. For the sake of clarity and simplification, the position designations p1–p9 are only stated for the raster image subareas A1' and E6' of the record carrier.

Figure 3:
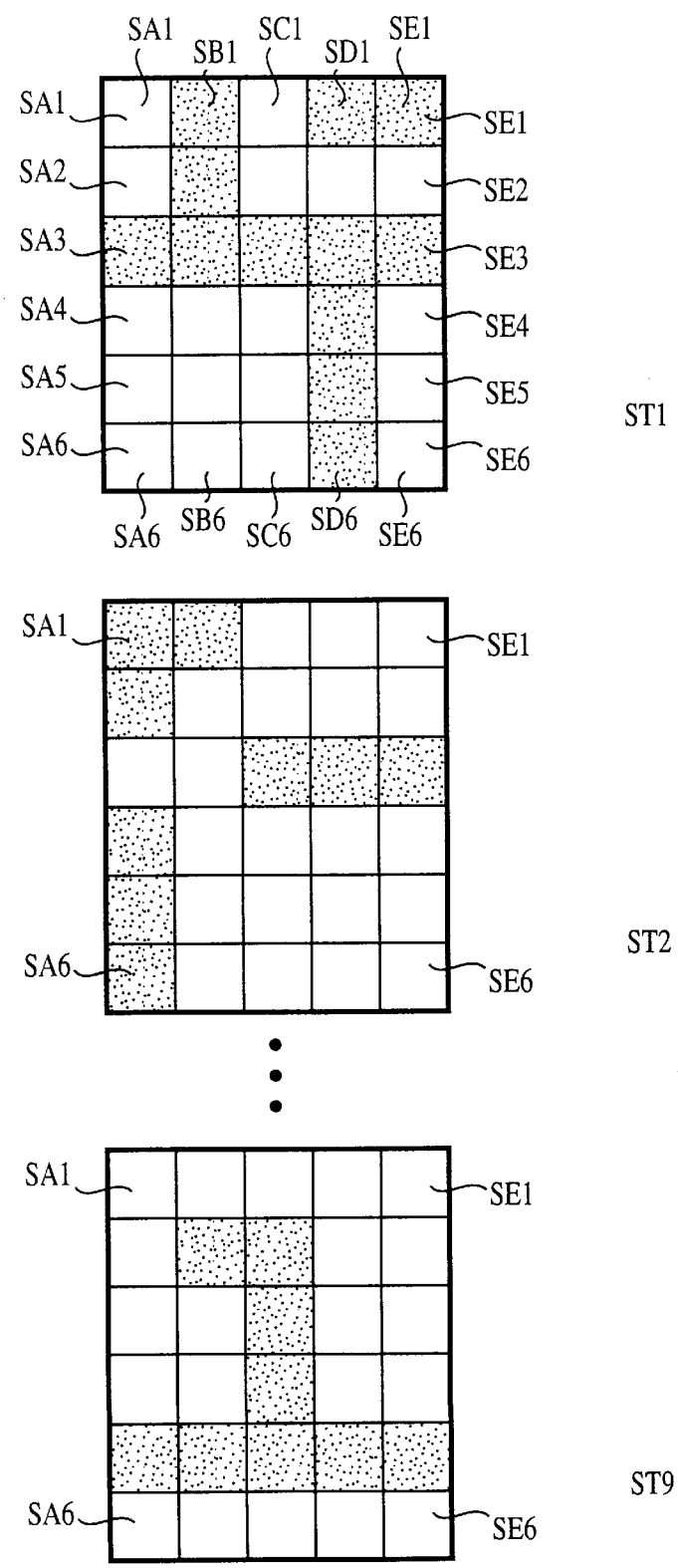
FIG. 3 is a schematic view of a control pattern sequence ST1, ST2, . . . , ST9 for the time intervals T1, T2 and T9.

FIG. 3 shows a schematic representation of a control pattern sequence ST1, ST2, . . . , ST9 for the time intervals T1, T2 and T9.

Each control pattern contains the control commands for the light modulation elements of the light modulation matrix 1 (FIG. 1) during a certain time interval. The control commands SA1, SB1, SC1, SD1, SE1; SA2, . . . SE2; SA3, . . . SE3; SA4, . . . SE4; SA5, . . . SE5; SA6, . . . SE6, depicted in a matrix-like arrangement, are associated with the light modulation elements LA1, LB1, LC1, LD1, LE1; LA2, . . . LE2; LA3, . . . LE3; LA4, . . . LE4; LA5, . . . LE5; LA6, . . . LE6 of the light modulation matrix 1. During the time interval T1, the control commands for the light modulation elements cause the latter to control the plotting of all the picture elements in all the picture element positions p1. These picture elements correspond to the raster points in the r1 positions of the computer raster image subareas. A picture element (represented white) is formed for a raster point with an "on" status (white circle); a picture element (represented black) is formed for a raster point with an "off" status (black circle).

Corresponding to the "on" status of the first raster point (white circle) in the position r1 of the computer raster image subarea A1, the control command SA1 (also represented white) causes the light modulation element LA1 (also represented white) to be controlled to admit the passage of light; as a result, the light beam la1 passing through the aperture a1 of the aperture matrix field HA1 plots a picture element (represented white) in the first position p1 of the raster image subarea A1' of the record carrier (FIG. 1).

By contrast, the "off" status of the first raster point (black circle) in the position r1 of the computer raster image subarea B1 has the effect that the control command SB1 (also represented black) switches the light modulation element LB1 (also represented black) to block the passage of light; as a result, no light can fall upon the aperture matrix field HB1 nor can a light beam pass through its aperture b1. This is equivalent to a ("missing") light beam "plotting" a missing picture element (represented black) in the first picture element position p1 of the raster image subarea B1' of the record carrier.

In this manner, the picture elements in the p1 positions of all the raster image subareas of the record carrier are plotted simultaneously during the first time interval T1. During the second time interval T2 following T1, all the picture elements in the p2 position of all the raster image subareas A1', B1', C1', . . . A2' . . . of the record carrier are plotted according to the control pattern ST2. The control commands for the control pattern ST2 are derived (analogous to ST1) from the "on" or "off" status of the raster points in the r2 position of the computer raster image subareas A1, B1, C1, . . . A2, . . . .

In order to ensure that the plotting of the picture elements in the second picture element positions p2 is carried out positionally accurate (below the p1 positions), the aperture matrix, as mentioned before, is correspondingly moved relative to the record carrier. (Similarly, the record carrier can also be moved relative to the aperture matrix.)

During each time interval with the respective control pattern, the necessary movement follows the freely predetermined sequence r1 to r9 of the raster points in the computer raster image subareas, which is equal to the sequence of the picture element positions p1 to p9 in the raster image subareas of the record carrier.

Analogously, the control pattern ST9 controls the plotting of the picture elements in the p9 positions.

The 3×3=9 raster points of a computer raster image subarea A1 or B1, etc., are associated with 3×3=9 picture elements of a raster image subarea A1' or B1', etc., of the record carrier. The plotting of all the picture elements takes place in the 9 time intervals T1–T9 with the respective control patterns ST1 to ST9.

Each time interval is characterized by a control pattern pertaining to it and by a corresponding movement of the aperture mask and the record carrier relative to each other. This movement ensures the positionally accurate arrangement of the picture elements.

Since the plotting of identically positioned picture elements takes place simultaneously in all the raster image subareas of the record carrier, the time interval T9 concludes the plotting of the total raster image of the record carrier.

Aperture Matrix

For a high resolution, the product ion of the aperture matrix must be carried out with the greatest precision, particularly with regard to the smallest apertures in the micrometer range and with regard to an exact, matrix-type arrangement of the apertures with spacings of about 100 micrometers.

A photoresist-coated glass plate with a thin chromium film can preferably be used as material for the aperture matrix. For producing the apertures, the photoresist is exposed to electron beams at the point s of future apertures according to the known E-beam method; after corresponding development, the chromium layer is etched away chemically.

The smaller the apertures in the aperture matrix, the higher the resolution of the raster image to be plotted. Depending on requirements, the apertures may, e.g., have a round or a square shape (as depicted in FIG. 1). Since the electron beams are subject to very precise, variable control, it is possible to design the apertures so as to compensate for aberrations due to optical projection, e.g., by providing a n elliptical design deviating from the circular shape.

The use of circular apertures in the aperture matrix enables relatively smooth contours of the raster image, depending on the degree of overlapping of the plotted picture elements.

Light Modulation Matrix

For the light modulation matrix (1), it is possible to use different commercial arrangements:

a) An LCD matrix (according to the embodiment shown in FIG. 1), e.g., of the type LDK 036 T-20 AM-LCD 2.8 inches from the company FLAT PANEL DISPLAY COMPANY, Eindhoven/Holland. Each light modulation element of this LCD matrix can be selectively controlled by electrical means in such a way that it is transparent or opaque to transmitted light.

Refined controls permit variation of the degree of transparency to (transmitted) light. Local fluctuations of the intensity or quantity of the light for projection onto the matrix can thus be compensated by corrective control.

Commercial liquid crystal matrices comprise from 640× 480 up to 1024×768 light modulation elements, which can be used for light in the wave range from 380 to 700 nm (nanometer). They are available in diagonal dimensions from 2.8 inches to 5.8 inches.

b) Tilting mirror chips, also known as digital light processing devices or digital mirror devices from the company Texas Instruments, where matrix-like arranged, electrostatically controllable tilting mirror elements can be placed in two different tilt attitudes (+, −10°) on the basis of semiconductor technology.

Arrangements of this type function by means of reflection, with the mirror element reflecting the light in two different directions. Each mirror is associated with an aperture matrix field having an aperture through which reflected light can pass or not pass according to the attitude of the tilting mirror. The light beam passing through this aperture causes the plotting of a picture element on the record carrier.

The light intensity control of a light passing through said aperture is possible by a corresponding timed control of the tilting mirror element that allows only part of the reflected light through this aperture.

Commercially available tilting mirror chips with an area of, e.g., 13.6 $mm^2$ and distances of 17 micrometers between the tilting mirror elements have a very high density of tilting mirror elements (800×600 elements).

In order to adapt the relatively small chip to the comparatively large aperture matrix (about 10×10 $cm^2$) an enlarging lens 9-6 is interposed between the tilting mirror chip and the aperture matrix, as described in greater detail in connection with the representation in FIG. 9.

The light is projected onto the LCD matrix by means of continuous light or momentary Xenon or laser flashes; the projection of light onto the tilting mirror chip occurs during flash operation.

A field of light-emitting elements, e.g., light-emitting diodes, which are controlled to emit light or not to emit light according to the status of the associated raster point in the computer raster image subarea, can also be used for the light modulation matrix.

The series of figures FIG. 4A to FIG. 4I is a schematic view of the control state of the light modulation element LA1 during the time intervals T1 to T9 in conjunction with the aperture a1, associated with said element LA1, of the aperture matrix field HA1 and the light beam passing (or not passing) through this aperture and causing the plotting of a picture element. This series of figures serves as a detailed and clear representation of the plotting of the picture elements in all the picture element positions p1–p9 of a raster image subarea A1' of the record carrier corresponding to the "on" or "off" status of a raster point in the positions r1–r9 of the computer raster image subarea A1.

Said subarea A1 is associated with the light modulation element LA1 and the raster image subarea A1' of the record carrier.

Figure 4A:
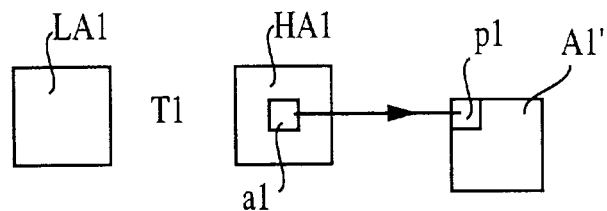
FIG. 4A–FIG. 4I is a schematic view of the control state of the light modulation element LA1 during the time intervals T1 to T9 in conjunction with the aperture a1, associated with said element LA1, of the aperture matrix field HA1 and the light beam passing (or not passing) through this aperture and causing the plotting of a picture element.

FIG. 4A: The raster point in position r1 in the computer raster image subarea A1 (FIG. 1) has an "on" status (white circle); accordingly, the light modulation element LA1 is controlled to admit the passage of light (represented white). The light beam la1 (solid arrow line) passing through the aperture a1 of the aperture matrix field HA1 (FIG. 1) plots a picture element (represented white) in the position p1 of the raster image subarea A1' of the record carrier.

Figure 4B:
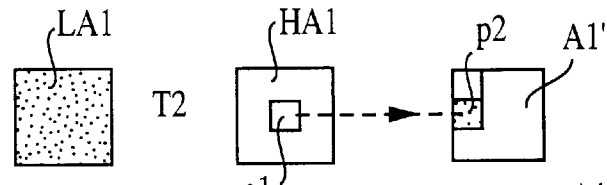
Figure 4C:
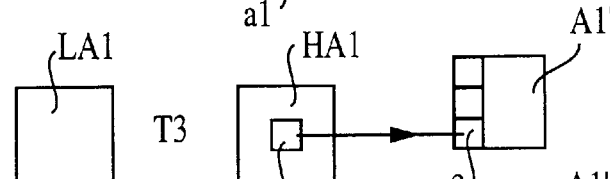
Figure 4D:
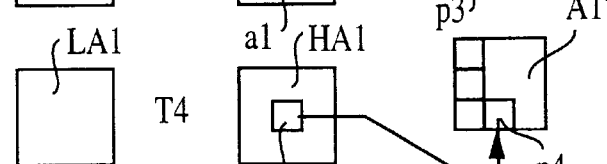
Figure 4E:
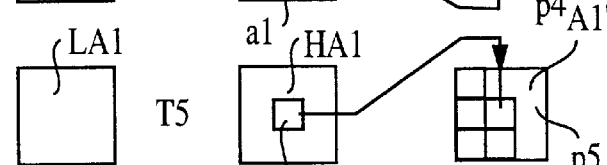
Figure 4F:
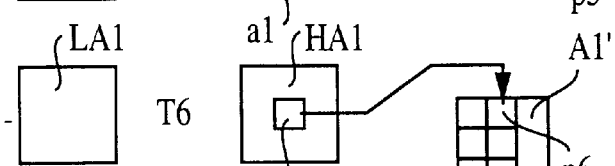
Figure 4G:
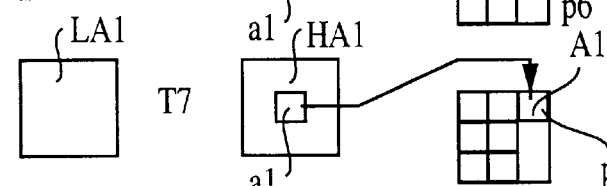
Figure 4H:
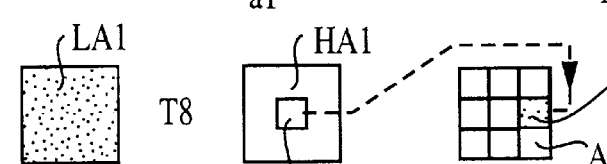

FIG. 4B: The aperture matrix and the record carrier 5 are moved relative to each other in such a way that a picture element can be plotted in the position p2 of the subarea A1' during the time interval T2. The raster point in position r2 in the subarea A' has an "off" status (black circle); accordingly, the light modulation element LA1 is controlled to block the passage of light (represented black). No light beam passes through the aperture a1 of the aperture matrix field HA1: due to the missing light beam (dashed arrow line) no picture element (represented black) is "plotted" in the position p2 of the subarea A1'.

The plotting of the picture elements in the positions p3 to p8 of the subarea A1' is carried out analogously and shall therefore not be explained further.

Figure 4I:
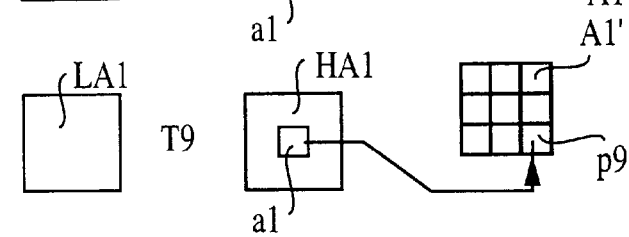

FIG. 4I: The aperture matrix and the record carrier 5 are moved relative to each other in such a way that a picture element can be plotted in the position p9 of the subarea A1' during the time interval T9. The raster point in position r9 in the subarea A1 has an "on" status; accordingly, the light modulation element LA1 is controlled to admit the passage of light (represented white). A light beam (solid arrow line) passes through the aperture a1 of the aperture matrix field HA1: due to this light beam a picture element (represented white) is "plotted" in the position p9 of the subarea A1'.

Since the plotting of identically positioned picture elements (in all p1 positions, or in all p2 positions, etc.) takes place simultaneously in all the raster image subareas of the record carrier, the end of the time interval T9 concludes the plotting of all the picture elements in all the subareas and thus the plotting of the total raster image.

Figure 5A:
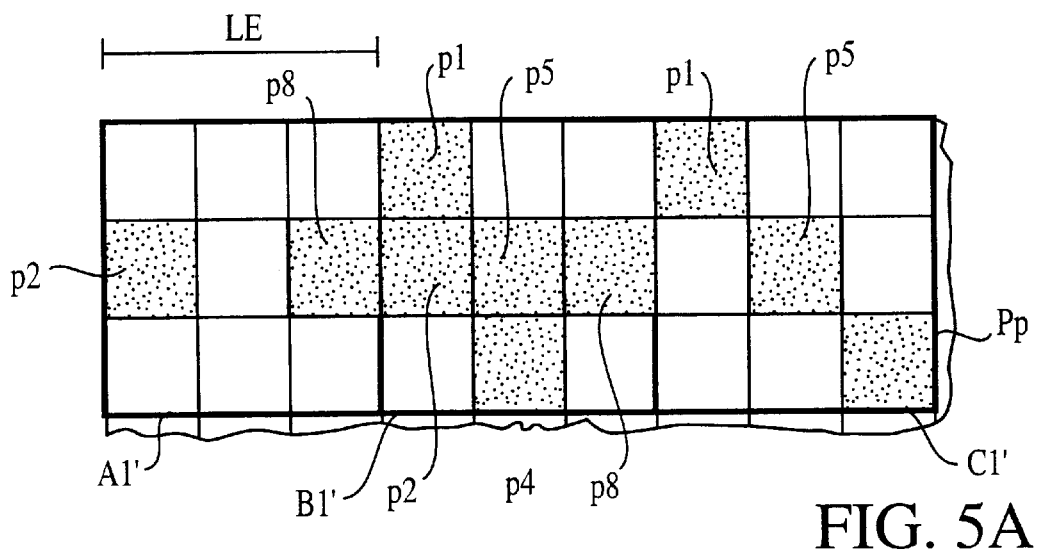
FIG. 5A is a schematic partial view of a raster image plotted with a certain image scale.
Figure 5B:
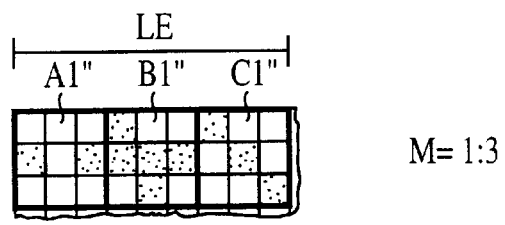
FIG. 5B is a schematic view of the raster image according to FIG. 5A on the image scale of 1:3.

FIG. 5A is a schematic partial view of a raster image plotted with a certain image scale, and FIG. 5B is a schematic view of the raster image according to FIG. 5A on the image scale of 1:3.

FIG. 5A is a partial view showing three adjoining raster image subareas A1', B1', C1' of the record carrier. "Missing picture elements" are represented black in the positions p2 and p8 in A1', as well as in the positions p1, p2, p4, p5 and p8 in B1', and in the positions p1, p5 and p9 in C1'.

Interposing a reducing lens 4 (FIG. 1) with a reduction factor of 1:3 between the aperture matrix 2 and the record carrier 5 reduces the raster image of the record carrier by one third as represented in FIG. 5B (compared with FIG. 5A). The same unit of length LE therefore results in a raster image resolution that is three times higher: according to FIG. 5A the unit of length LE comprises only 3 picture elements, whereas according to FIG. 5B it comprises 9 picture elements.

Figure 6A:
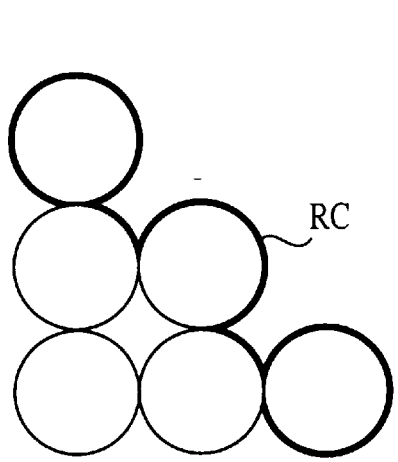
FIG. 6A is a schematic view of different non-overlapping, circular picture elements for the formation of an edge contour RC.

FIG. 6A is a schematic view of different non-overlapping, circular picture elements for the formation of an edge contour RC.

Figure 6B:
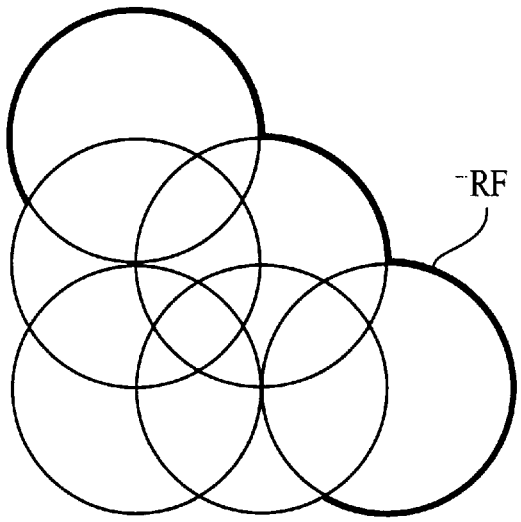
FIG. 6B is a schematic view of different circular picture elements, overlapping each other by 50%, for the formation of an edge contour RF.

FIG. 6B is a schematic view of different circular picture elements, overlapping each other by 50%, for the formation of an edge contour RF.

As mentioned above, the "picture points" (picture elements) of the record carrier can have different shapes: round, square, etc., depending on the shape of the apertures in the aperture matrix. The picture elements can also overlap each other in order to satisfy certain contour requirements.

FIG. 6A shows how a certain arrangement of non-overlapping, circular picture elements can form a coarse edge contour RC. By contrast, FIG. 6B shows the formation of a finer edge contour RF with, also circular, picture elements overlapping each other by 50%.

Figure 7:
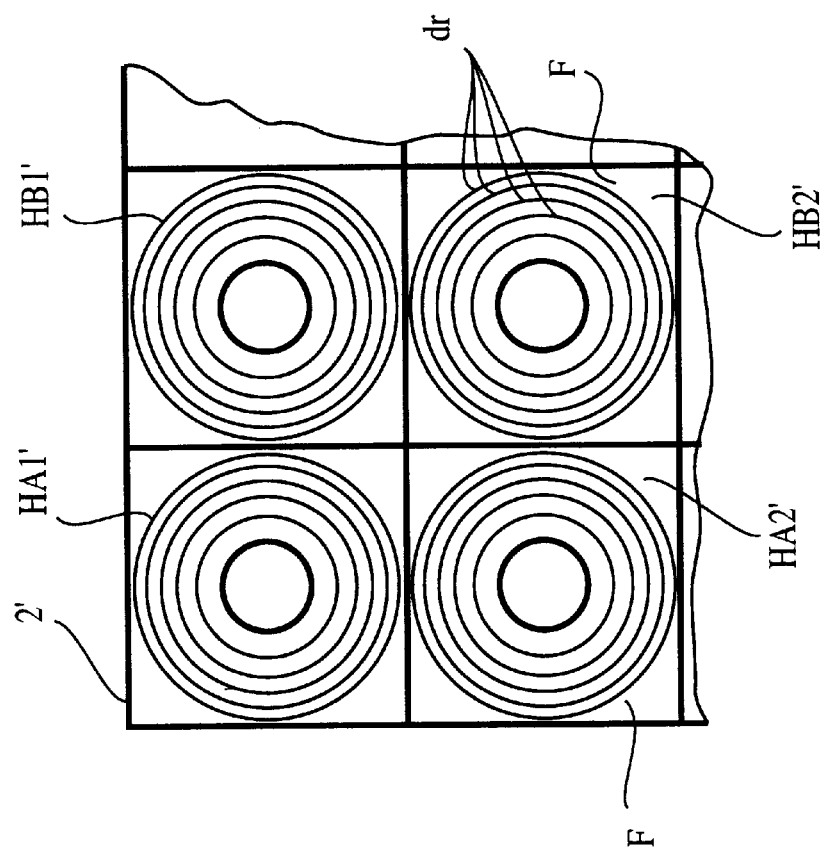
FIG. 7 is a schematic partial top view of different aperture matrix fields with Fresnel zone plates.

FIG. 7 is a partial top view of an aperture matrix 2', where Fresnel zone plates F are arranged on the different fields HA1', HB1', HA2', HB2'.

(It shall initially be explained that the light emanating from a light modulation element (e.g., LA1) falls upon the aperture matrix field HA1 associated with said element, and that only part of this light, striking the aperture a1 of said field as a light beam la1, causes the plotting of a picture element in the picture element position p1. The light incident outside the aperture in field HA1 plays no part in the plotting of the picture element: it is quasi lost.

However, this lost light is utilized for the plotting of the picture element by the following means; thereby said light is also made to pass through the aperture a1, so as to participate in the plotting of the picture element:

a) Mounting of a (not represented) focussing lens on each aperture matrix field, so as to direct the light falling upon said aperture matrix field through the aperture a1. However, arrangements of this type, referred to as lens fields, can only be realized at great expenditure.

b) Mounting of a Fresnel zone plate F on each aperture matrix field. It is known that light can be bundled by the use of a Fresnel zone plate based on the Huygens' principle (Fresnel zone plates of this type, i.e., diffraction gratings, are described in the publication "OPTICS", Hecht & Zajac, 1974, by Addison-Wesley Publishing Company).

Such a wavelength-specific diffraction grating is formed by flat concentric chromium or photoemulsion rings mounted on substrate material transparent to light. The diffraction grating causes the incident light to be directed through the aperture (here assumed to be round) arranged in the centre of said grating in the aperture matrix field HA1', HB1', HA2'.

The proportion of light falling upon the rings is lost through reflection, unless the rings comprise of a material that causes the incident light to be out-of-phase by half a wavelength (see above source, page 376, "phase-reversal zone plate"). In such a case, the proportion of light falling upon the rings is also directed through the aperture of the aperture matrix field.

The use of Fresnel zone plates according to the state of the art is known for certain types of application (e.g., telecommunications, laser focussing). These zone plates may also have, e.g., an elliptical shape, instead of a circular one, in order to correct aberrations of the lens systems employed (compensation of the angles of incidence in the case of non-collimated light).

Movement Mechanism

Figure 8:
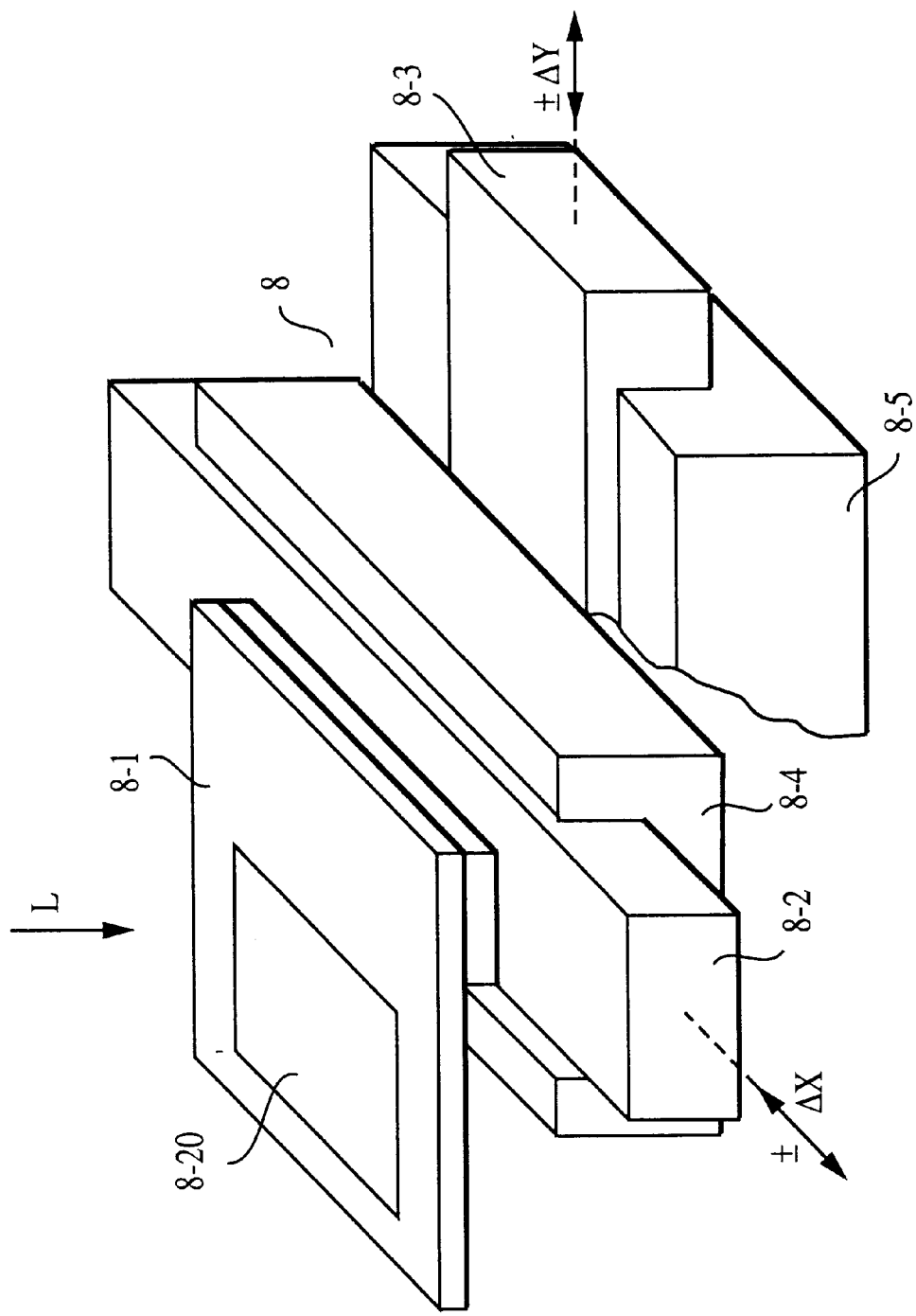
FIG. 8 is a schematic perspective view of an X/Y-stage of a movement mechanism for the aperture mask.

FIG. 8 is a schematic perspective view of an X/Y-stage of a movement mechanism for the aperture mask;

For the movement of the aperture matrix 8–20 (in both coordinate directions) relative to the record carrier, the aperture matrix 8–20 is arranged in a holder 8-1 which is connected with the X/Y-stage of a movement mechanism 8. This movement mechanism 8 comprises two carriages, with one (X-) carriage 8-2 in X-direction and the other (Y-) carriage 8-3 in Y-direction moving stepwise or also continuously back and forth with the greatest precision.

The X-carriage 8-2 slides in the carriage base 8-4, while the Y-carriage 8-3 slides in the carriage base 8-5. The carriage base 8-4 is connected with the carriage 8-3.

Since the maximum movement distances of the X- and the Y-carriage are relatively small (they lie in the order of the dimensions of one aperture matrix field or several such fields), these movement mechanisms make it possible to fulfill the highest tolerance requirements. In the case of larger movement distances, as occur with the mentioned state of the art, where the exposure head has to be moved over the entire record carrier area, it is much more difficult to ensure high tolerance requirements for the precise positioning of the exposure head.

The carriage drive is realized in a manner known in the art, e.g., by means of stepping motors (not represented) with reduction gearing or directly by means of linear motors.

The stepping motors are controlled with the aid of a computer program by electrical pulses. For each control pattern ST1–ST9, i.e., during each time interval T1–T9, the aperture matrix 2 is moved to a certain movement position relative to the stationary record carrier 5, in order to ensure positionally accurate plotting of the picture elements.

For movements in the micrometer range, as necessary, e.g., when using tilting mirror chips, movement mechanisms comprising piezoelectric crystal elements may conveniently be used. When an electric control voltage is applied to these elements, they undergo, in a manner known in the art, a defined change in length as required for the movement. The movement control is again carried out with the aid of a computer program.

In the simplest (only theoretically assumed) case (area of the tilting mirror chip=area of the aperture matrix) and when parallel light is used without interposing any lenses, the tilting mirror chip and the aperture matrix could be moved together relative to the record carrier.

Taking account of the existing sizes of the very small tilting mirror chip and the larger aperture matrix, an enlarging lens 9-6 (FIG. 9) is arranged between these two, in order to adapt the smaller device area to the larger aperture matrix area.

It is conceivable that all three units comprising tilting mirror chip/lens/aperture matrix are moved together, in order to achieve a positionally accurate plotting of the picture elements. However, such a solution would have the disadvantage that the lens, which involves a relatively large mass, would also have to be moved with each movement step. For this reason, it is advantageous not to include the lens in the movement mechanism as described below in connection with FIG. 9. The lens remains in a stationary position. Only the tilting mirror chip and the relatively light aperture matrix are moved relative to the record carrier.

Figure 9:
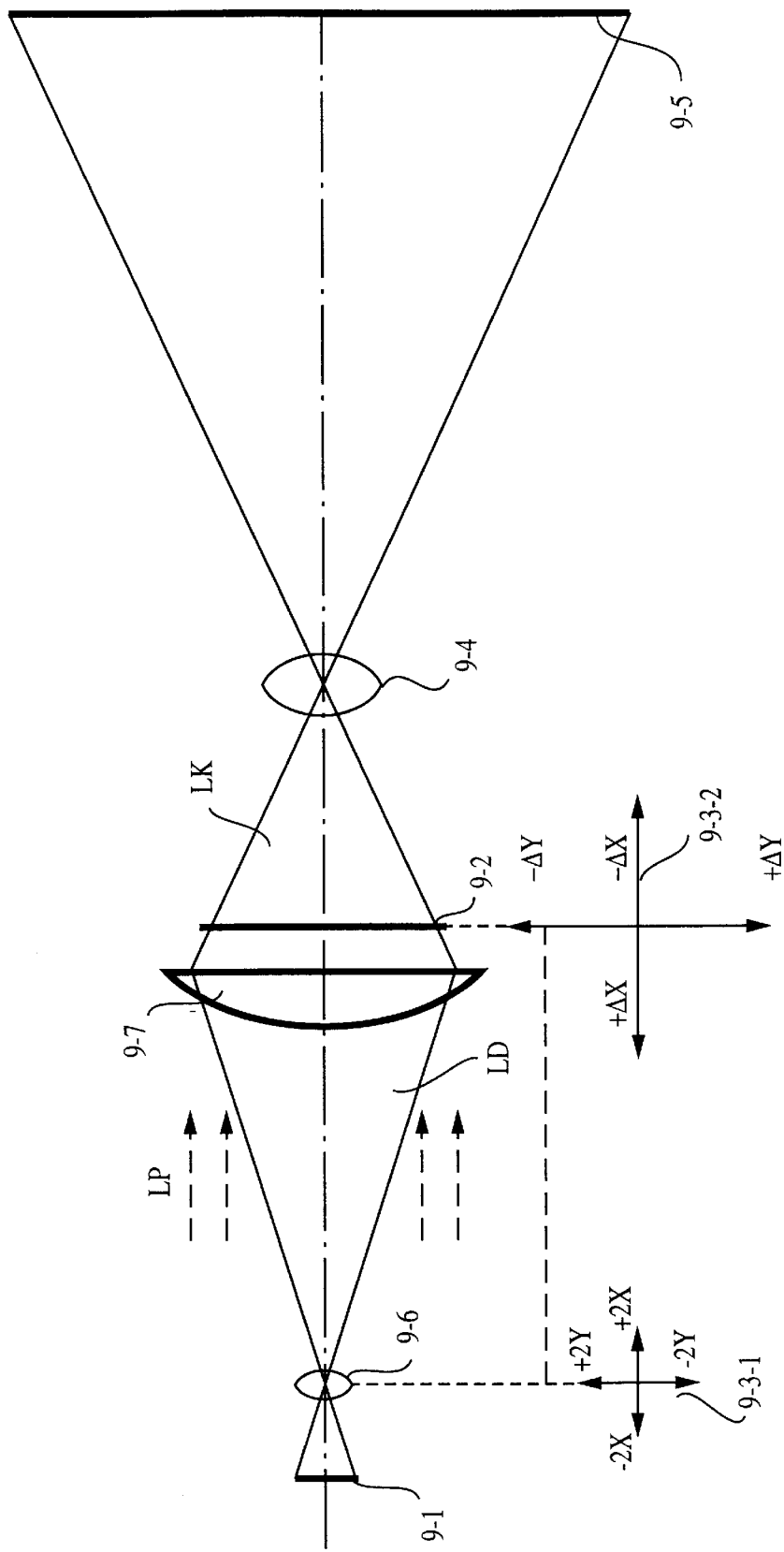
FIG. 9 is a schematic view of an arrangement according to the invention, containing a tilting mirror chip and different lenses.

FIG. 9 is a schematic view of an arrangement according to the invention, containing a tilting mirror chip 9-1 and lenses 9-6, 9-7 and 9-4.

As previously mentioned, it is possible to change the image scale of the raster image of the record carrier by interposing a corresponding lens between the aperture matrix and the record carrier.

A reduced-scale image permit a greater resolution. The physical limit of the resolution is set, on the one hand, by the resolution of the record carrier and, on the other hand, by the wavelength of the light and the characteristics of the optical system.

In order to minimize the size of the scale-determining lens 9-4 (the larger, the more expensive) in the arrangement according to FIG. 9, the light projected onto the aperture matrix 9-2 does preferably not comprise of parallel light LP (dashed lines), but of converging light LK radiating from a condenser lens 9-7. With the use of parallel light, the scale-determnining lens 9-4 would have to be of a size corresponding to the aperture matrix 9-2, but in the case of converging light the lens 9-4 can be smaller.

The record carrier is marked with 9-5. As already mentioned, the light efficiency can be increased considerably by lens fields or the use of Fresnel zone plates (FIG. 7).

When using a tilting mirror chip 9-1, an enlarging lens 9-6 is interposed for the purpose of adapting the relatively small area of the tilting mirror chip to the relatively large area, by comparison, of the aperture matrix. The diverging light LD radiating from said lens 9-6 is converted by the condenser lens 9-7 into converting light LD.

For a movement enabling accurate picture-element positions, the laterally and vertically reversing effect of the lens and its enlarging effects must however be taken into account to the extent that the tilting mirror chip and the aperture matrix have to be moved relative to each other in steps of different sizes while being synchronized with each other. Since the movement steps for the tilting mirror device and for the aperture matrix are extremely small (they lie in the range of 0.1 micrometers) because of the small dimensions of the tilting mirror chip in connection with the enlargement factor of the lens 9-6, the movement mechanisms have to function with extreme precision.

In FIG. 9, said movement mechanisms are indicated symbolically by Cartesian coordinate systems 9-3-1 and 9-3-2. They are adapted to each other; their movement steps ($\pm\delta x$, $\pm\delta y$; $\pm\Delta x$, $\pm\Delta y$) can be of different sizes. The movement mechanisms are controlled with the aid of a computer program.

Figure 10:
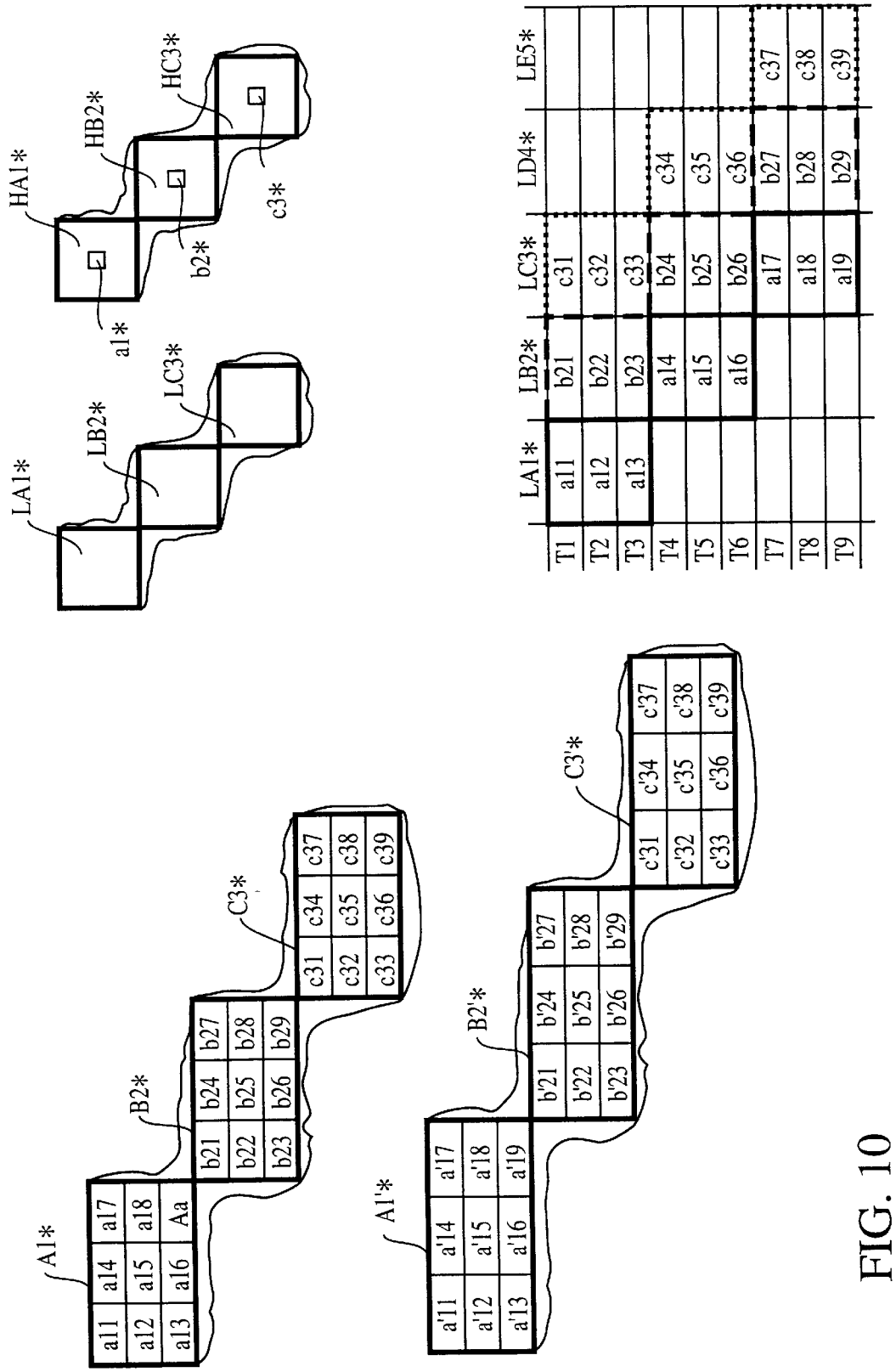
FIG. 10 is a schematic view of a movement area of the aperture matrix extending over several fields of the aperture matrix, where the raster points of a computer raster image subarea are associated with several neighboring light modulation elements of the light modulation matrix.

FIG. 10 is a schematic view of a movement area of the aperture matrix extending over several fields of the aperture matrix, where the raster points of a computer raster image subarea are associated with several neighboring light modulation elements of the light modulation matrix.

The raster points of the computer raster image subareas A1*, B2*, C3* are marked a11–a19, b11–b19 and c11–c19 for the purpose of differentiation. In the corresponding raster image subareas A1'*, B2'*, C3'* of the record carrier, the picture elements pertaining to the raster points are marked with a'11-a'19, b'11-b'19, c'11-c'19.

The tables show which raster points are associated with which light modulation element during, which time interval.

Example: During the time interval T1, raster point a11 is associated with the light modulation element LA1*, raster point b11 is associated with the light modulation element LB2*, and raster point c11 is associated with the light modulation element LC3*.

During the time interval T4, the associations change to the extent that the raster points a14–a16 of the computer raster image subarea A1* are no longer associated with the light modulation element LA1*, but with LB2*; this applies analogously to the raster points b24–b26 and c34–c36.

As from the time interval T6, the associations change again: the raster points a16–a19 of the computer raster image subarea A1* are now associated with the light modulation element LC3*; this applies analogously to the raster points a17–a19, b27–b29 and c37–c39.

During the examination in connection with the representation according to FIG. 1 it has so far been assumed that the movement of the aperture matrix relative to the record carrier is carried out in such a way that the light beam passing through the aperture a1 of the aperture matrix field HA1 is successively aligned with all the picture element positions p1–p9.

If a certain light modulation element of the LCD matrix should fail during the movement of the aperture matrix, the raster image of the record carrier would have a plotting error, affecting maximal nine picture elements, in the position of the raster image subarea of the record carrier that is associated with the faulty light modulation element.

In order to prevent a plotting error occurring in such a concentrated manner in the case of the failure of a light modulation element, the movement area of the aperture matrix is increased, with the raster points of a computer raster image subarea always being associated groupwise with another light modulation element.

As can be seen in FIG. 10, the raster points a11, a12, a13 are associated with the light modulation element LA1* during the time intervals T1, T2, T3; the raster points a14, a15 and a16 are associated with the light modulation element LB2* during the time intervals T4, T5 and T6; and the raster points a17, a18 and a19 are associated with the light modulation element LC3* during the time intervals T7, T8 and T9.

This applies analogously to the raster points b21–b23 associated with the light modulation element LB2* during the time intervals T1 to T3, etc.

In view of this changing association of the raster points of a computer raster image subarea with different neighboring light modulation elements (here in diagonal order), the movement area of the aperture matrix relative to the record carrier is increased as follows in order to plot the picture elements corresponding to the raster points.

The aperture matrix is moved in such a way (while the LCD matrix is stationary) that the aperture a1* of the aperture matrix field HA1* points at the position of the picture element a'11 during the time interval T1, in order to plot said picture element a'11 corresponding to the raster point a11, etc., until the aperture b2* of the aperture matrix field HB2* points at the position of the picture element a'14 during the time interval T4, in order to plot said picture element a'14 corresponding to the raster point a14, etc. (Note: For this purpose, the aperture matrix has to be moved in such a way that the aperture a1* is now aligned with the light modulation element LB2* instead of the previous LA1*.) Analogously, the aperture c3* of the aperture matrix field HC3* must be aligned with the position of the picture element a17 during the time interval T7.

For plotting all the picture elements, the movement of the aperture matrix therefore has to proceed in a stepped manner over three light modulation elements. (Movement sequences other than diagonal ones are also conceivable.)

The larger movement area described above has the advantage that in the case of failure of a light modulation element (e.g., LA1*), only 3 picture elements (a11–a13) in the raster image subarea A1* of the record carrier may be faulty, and not all the picture elements, since the other picture elements a14–a19 are plotted by means of other light modulation elements (LB2*, LC3*) and not by means of LA1*.

When using monochromatic light, it is necessary to take into account:

a) the type of wavelength of the incident light that is relevant for the photosensitive part of the record carrier (photoemulsion, -resist, selenium);

b) the wavelength region where the LCD matrices can be used. The LCD matrices known in the prior art function in the region of visible light, but they are not satisfactory in the ultraviolet (UV) region;

c) tilting mirror chips, by contrast are also well suitable for use in the ultraviolet region in addition to the visible wavelength region of the light.

It is expressly pointed out here that according to the invention it is also possible to use light (in form of electromagnetic wave radiation) with shorter wavelengths than in the visible wavelength region. Even X-radiation can be employed, although the equipment expenditure for the elements and lens systems controlling this type of radiation is very high.

The invention can be used in diverse fields of application involving the plotting of a raster image on a photosensitive record carrier: this may be, e.g., the production of photographic artwork for printed circuit boards or cards, for silk-screen printing, etc. There are also applications conceivable where the photosensitive record carrier does not comprise of a film to be chemically developed, but of a material which becomes electrically charged during exposure, thereby attracting or repelling charge-sensitive, printable toner.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method of plotting a raster image on a plane record carrier, in which a computer-stored raster image including raster points is convertable into controllable, raster-point related light beams enabling the plotting of picture elements, that correspond to the raster points, on the record carrier, the method comprising:

dividing the computer raster image into matrix-like imaginary computer raster image subareas;

dividing the raster image of the record carrier into matrix-like imaginary raster image subareas of the record carrier;

associating the subareas of the computer raster image and the subareas of the raster image of the record carrier with each other;

dividing the computer raster image subareas into n matrix-like imaginary raster point positions;

dividing the raster image subareas of the record carrier into n matrix-like imaginary picture element positions;

associating the n matrix-like picture element positions with the n matrix-like raster point positions;

successively plotting the picture elements that correspond with the raster points in successive time intervals Tq, wherein q represents values 1–n, and simultaneously plotting, during a $q^{th}$ time interval, respective $q^{th}$ picture elements associated with a $q^{th}$ picture element position of the raster image subareas of the record carrier; and moving, during the $q^{th}$ time interval, an aperture matrix that includes matrix-like arranged aperture matrix fields, each having an aperture for passing a light beam, and aligning each aperture with the $q^{th}$ picture element position to plot the respective $q^{th}$ picture element.

2. The method according to claim 1, further comprising:

successively plotting all of the picture elements of a respective raster image subarea of the record carrier via the light beam passing through the aperture of the aperture matrix field associated with said respective raster image subarea.

3. The method according to claim 1, further comprising:

successively plotting all of the picture elements of a respective raster image subarea of the record carrier via the light beams passing through the apertures of different aperture matrix fields in an order that is freely determined.

4. The method according to claim 1, further comprising:

converting the computer raster image into controllable light beams via a light-irradiated liquid crystal device matrix having matrix-like arranged light modulation elements that are associated with respective computer raster image subareas;

controlling, during the $q^{th}$ time interval, each light modulation element to one of block and admit the passage of light according to a status of the $q^{th}$ raster point of the computer raster image subarea associated with said light modulation element;

directing light passing through said light modulation element onto the aperture matrix field in a position associated with said light modulation element; and plotting a picture element via the light beam passing through the aperture of said aperture matrix field.

5. The method according to claim 1, further comprising:

converting the computer raster image into controllable light beams via a light-irradiated liquid crystal device matrix having matrix-like arranged light modulation elements;

associating each computer raster image subarea with one of several light modulation elements for a certain number of time intervals;

controlling, during the $q^{th}$ time interval, a respective associated light modulation element to one of block and admit the passage of light according to a status of the $q^{th}$ raster point of the computer raster image subarea;

directing the light passing through said light modulation element onto the aperture matrix field in a position associated with said light modulation element; and plotting a picture element via the light beam passing through the aperture of said aperture matrix field.

6. The method according to claim 1, further comprising:

positioning an image-scale determining lens arranged between the aperture matrix and the record carrier to adjust a size of the raster image of the record carrier.

7. The method according to claim 1, wherein the converting of the computer raster image into controllable light beams comprises use of a light-irradiated tilting mirror chip.

8. The method according to claim 1, wherein the converting of the computer raster image into controllable light beams comprisese use of a matrix of light modulation elements.

9. The method according to claim 1, further comprising:

irradiating the aperture matrix with one of parallel and converging light on a side directed away from the record carrier.

10. The method according to claim 1, wherein the converting of the computer raster image into controllable light beams and the movement of the aperture matrix and the record carrier relative to each other are controlled via a computer program.

11. The method according to claim 1, wherein the light falling upon the aperture matrix fields is directed through respective apertures.

12. The method according to claim 1, wherein the light beam comprises monochromatic visible light.

13. The method according to claim 1, wherein the light beam comprises invisible light having a wavelength equal to or smaller than the wavelength of light in an ultrared region.

14. The method according to claim 1 for use in the production of photographic artwork for printed circuit boards.

15. An arrangement for plotting a computer-stored raster image on a plane, photosensitive record carrier comprising:

a matrix-like arrangement of one of controllable light-emitting elements and controllable light-irradiated light modulation elements;

an aperture matrix having divided aperture matrix fields, each aperture matrix field comprising an aperture for the passage of a light beam to plot a picture element on the record carrier;

the record carrier comprising a matrix-like arrangement of raster image subareas, each raster image subarea comprising a matrix-like arrangement of picture element positions;

a movement mechanism adapted to move the aperture matrix and the record carrier relative to each other;

the computer-stored raster image being divided into a matrix-like arrangement of computer raster image subareas, each computer raster image subarea comprising a matrix-like arrangement of raster point positions, each raster point position having a binary storage status;

the computer raster image subareas and the raster image subareas are associated with each other;

the raster point positions of the computer raster image subareas and the picture element positions of the raster image subareas of the record carrier are associated with each other;

a number of the one of the controllable light-emitting elements and the controllable light-irradiated elements is the same as a number of apertures of the aperture matrix and the same as a number of raster image subareas of the record carrier;

the movement mechanism adjustably aligns the apertures of the aperture matrix field with the picture element positions of the raster image subareas of the record carrier;

a control device that controls the one of the controllable light-emitting elements and the light-irradiated elements in accordance with the storage status of the raster point position associated with said movement position, so that, for each movement of the movement mechanism, the aperture mask fields associated with the one of the controllable light-emitting elements and the light-irradiated elements either can or cannot be irradiated with light;

the picture elements of a respective raster image subarea of the record carrier being successively plotted; and the picture elements associated with same picture element positions of the raster image subareas of the record carrier being simultaneously plotted.

16. The arrangement according to claim 15, the control device comprising a computer program.

17. The arrangement according to claim 15, a position of the aperture of the aperture matrix field is associated with positions of the one of the controllable light-emitting elements and controllable light-irradiated elements and each aperture is successively alignable with all picture element positions of a raster image subarea of the record carrier.

18. The arrangement according to claim 15, a position of the aperture of a plurality of the aperture matrix fields is adjustably associated with positions of the one of the controllable light-emitting elements and controllable light-irradiated elements and each aperture is successively alignable with all the picture element positions of a raster image subarea of the record carrier.

19. The arrangement according to claim 15, further comprising an image-scale determining lens positioned between the aperture matrix and the record carrier.

20. The arrangement according to claim 19, further comprising a light-concentrating element is positioned on a side of each aperture matrix field positioned away from the record carrier, to enable the light falling upon the aperture matrix fields to be directed through the respective apertures.

21. The arrangement according to claim 20, the light-concentrating element being composed of one of optical lenses and Fresnel zone plates.

22. The arrangement according to claim 21, the Fresnel zone plates being composed of concentrically arranged flat circular or elliptical rings.

23. The arrangement according to claim 22, the concentrically arranged circular or elliptical rings being composed of a material that shifts the phase of incident light by one-half a wavelength of the light.

24. The arrangement according to claim 19, further comprising a condenser lens that generates converging light being located on a side of the aperture matrix turned away from the record carrier; and
the image-scale determining lens being smaller than the aperture mask.

25. The arrangement according to claim 16, the matrix arrangement of light-irradiated elements being composed of a liquid crystal device matrix.

26. The arrangement according to claim 16, the matrix arrangement of light-irradiated elements being composed of a tilting mirror chip.

27. The arrangement according to claim 15, the movement mechanism comprising one of a stepping-motor controlled XY-coordinate stage and a piezoelectric-crystal controlled device.

28. An arrangement for plotting a computer-stored raster image on a plane, photosensitive record carrier comprising:
a matrix-like arrangement of one of controllable light-emitting elements and controllable light-irradiated light modulation elements, wherein the matrix-like arrangement of light-irradiated elements is composed of a tilting mirror chip;
an aperture matrix having divided aperture matrix fields, each aperture matrix field comprising an aperture for the passage of a light beam to plot a pictutre element on the record carrier;
the record carrier comprising a matrix-like arrangement of raster image subareas, each raster image subarea comprising a matrix-like arrangement of picture element positions;
a movement mechanism adapted to move the aperture matrix and the record carrier relative to each other;
the computer-stored raster image being divided into a matrix-like arrangement of computer raster image subareas, each computer raster image subarea comprising a matrix-like arrangement of raster point positions, each raster point position having a binary storage status;
the computer raster image subareas and the raster image subareas are associated with each other;
the raster point positions of the computer raster image subareas and the picture element positions of the raster image subareas of the record carrier are associated with each other;
a number of the one of the controllable light-emitting elements and the controllable light-irradiated elements is the same as a number of apertures of the aperture matrix and the same as a number of raster image subareas of the record carrier;
the movement mechanism adjustably aligns the apertures of the aperture matrix field with the picture element positions of the raster image subareas of the record carrier;
a control device, comprising a computer program, that controls the one of the controllable light-emitting elements and the light-irradiated elements in accordance with the storage status of the raster point position associated with said movement position, so that, for each movement of the movement mechanism, the aperture mask fields associated with the one of the controllable light-emitting elements and the light-irradiated elements either can or cannot be irradiated with light;
the picture elements of a respective raster image subarea of the record carrier being successively plotted;
the picture elements associated with same picture element positions of the raster image subareas of the record carrier being simultaneously plotted; and
a condenser lens that generates converging light being located on a side of the aperture matrix turned away from the carrier records,
wherein the image-scale determining lens is smaller than the aperture matrix.

29. The arrangement according to claim 28, further comprising an enlarging lens being arranged between the tilting mirror chip and the condenser lens.

30. The arrangement according to claim 29, the tilting mirror chip and the aperture matrix being movable in opposite directions to each other,
wherein, the movement of the chip and the aperture matrix are dependent upon the enlargement factor of the enlarging lens.

* * * * *